AUTOMATIC TELEPHONE SYSTEMS

Filed Dec. 23, 1953 12 Sheets-Sheet 1

Inventor
Bloomfield James Warman
By H. J. Hendey
Attorney

Inventor

BLOOMFIELD JAMES WARMAN

By H. S. Hendry

Attorney

Inventor
Bloomfield James Warman
By H. S. Hendry
Attorney

Inventor
Bloomfield James Warman
By H. G. Hendry
Attorney

AUTOMATIC TELEPHONE SYSTEMS

Filed Dec. 23, 1953 12 Sheets-Sheet 5

Inventor
BLOOMFIELD JAMES WARMAN
By H. G. Hendry
Attorney

Inventor
Bloomfield James Warman
By H. S. Hendry
Attorney

Inventor
BLOOMFIELD JAMES WARMAN
By H. S. Hendry
Attorney

Sept. 24, 1957 B. J. WARMAN 2,807,671

AUTOMATIC TELEPHONE SYSTEMS

Filed Dec. 23, 1953 12 Sheets-Sheet 8

Inventor

Bloomfield James Warman

By H. S. Hendry

Attorney

Sept. 24, 1957 B. J. WARMAN 2,807,671

AUTOMATIC TELEPHONE SYSTEMS

Filed Dec. 23, 1953 12 Sheets-Sheet 9

Inventor

BLOOMFIELD JAMES WARMAN

By H. S. Hendry

Attorney

Inventor
BLOOMFIELD JAMES WARMAN
By H. S. Hendry
Attorney

Inventor
BLOOMFIELD JAMES WARMAN
By H. S. Hendry
Attorney

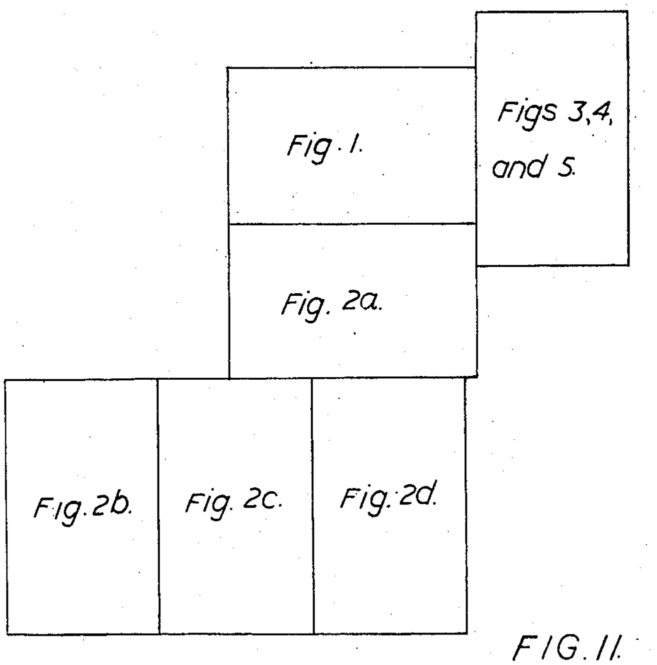
FIG. 11.
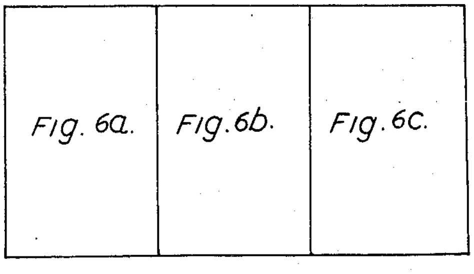
Inventor
BLOOMFIELD JAMES WARMAN
By H. S. Hendry
Attorney 2,807,671
Patented Sept. 24, 1957

2,807,671

AUTOMATIC TELEPHONE SYSTEMS

Bloomfield James Warman, Blackheath, London, England, assignor to Siemens Brothers & Co. Limited, London, England, a British company Application December 23, 1953, Serial No. 399,965

Claims priority, application Great Britain December 29, 1952

12 Claims. (Cl. 179—18)

Figure 1:
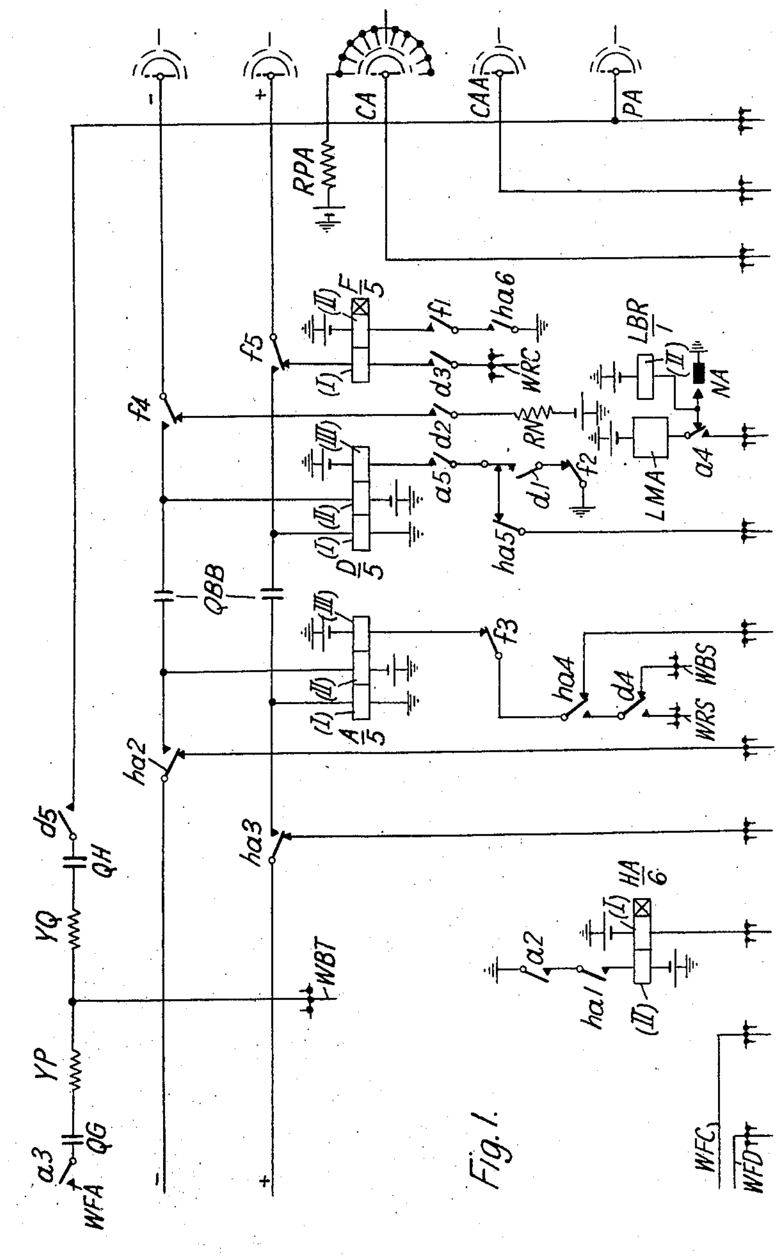

This invention relates to automatic telephone systems, and has in view the provision of improved automatic telephone exchange selecting arrangements employing uniselectors. It is especially, but not exclusively, concerned with automatic telephone exchange selecting arrangements employing high-speed motor-driven uniselectors.

The automatic telephone exchange selecting arrangements of the invention are such that impulse counting chains of electronic devices serve for registering received digits and for controlling the selective operation of uniselectors in accordance with these digits. The main features of the invention permit selecting arrangements to be provided in which a very economic and efficient use is made of impulse counting chains of electronic devices serving as just stated.

The expression "electronic device" used herein is intended to be interpreted broadly enough to include within its scope where appropriate a single discharge gap of a multi-gap discharge device.

According to one feature of the invention, arrangements for the selective operation, in accordance with a received digit, of a uniselector constituting a group or final selector are such that an impulse counting chain of electronic devices is set to register the value of the digit before any selective movement of the uniselector from a specific starting position takes place, and that in general the impulse counting chain is subsequently further set, by complementary impulses fed to it in correspondence with selective movement of the uniselector from the specific starting position, until it registers a predetermined total, the outlets of the uniselector being so allocated and the means for producing the complementary impulses being such that the registration of the predetermined total by the impulse counting chain serves to signify that the uniselector has reached a position in accordance with the value of the digit. An important advantage gained by the use of an impulse counting chain of electronic devices, instead of an electro-mechanical counter such as a counting chain of electromagnetic relays, is that an impulse counting chain of electronic devices is capable of acting at such a high speed that the selective movement of the uniselector can take place at the maximum operating speed of the uniselector, even in a case where the uniselector is a high-speed one. Where the uniselector constitutes a group selector, the registration of the predetermined total would normally be arranged to render effective circuits for testing into, and stopping the uniselector upon, a free outlet in the requisite group. The predetermined total may be the same (for example ten) for all values of the digit, or the predetermined total may vary with the value of the digit insofar that one total may apply in the case of one group of consecutive values of the digit and another total apply in the case of another group of consecutive values. Especially, the predetermined total may be five in the case of the values "1" to "5" of the digit, and ten in the case of the values "6" to "0."

According to another feature of the invention, arrangements for the selective operation, in accordance with received tens and units digits, of a uniselector constituting a final selector are such that before any selective movement of the uniselector from a specific starting position takes place a first impulse counting chain of electronic devices is set to register the value of the tens digit and a second impulse counting chain of electronic devices is set to register the value of the units digit, and that thereafter in general the first impulse counting chain is further set, until it registers a total of ten, by complementary impulses each resulting from a registration of a total of ten by the second impulse counting chain, and the second impulse counting chain is further set, by complementary impulses fed to it in correspondence with selective movement of the uniselector from the specific starting position, until it has registered a total of ten the number of times necessary to produce the condition that both the first and second impulse counting chains are registering a total of ten, the outlets of the uniselector being so allocated and the means for producing the complementary impulses being such that the attainment of the said condition serves to signify that the uniselector has reached a position in accordance with the tens and units digits. Unless a PBX group is involved, the attainment of the said condition would normally result in the immediate stopping of the uniselector in the position reached.

In carrying out the invention, wiper switching may be effected at one or more selecting stages, and groups may be combined at one stage and resolved at a later stage as in known systems. In one combining and resolving arrangement which is contemplated, groups are combined in pairs at a first group selector and resolved by wiper switching at the final selector.

The nature of the invention will now be made clearer by a description with reference to the accompanying drawings of various specific embodiments of it. Fig. 1 of the drawings shows a first group selector circuit, Figs. 2*a*, 2*b*, 2*c*, and 2*d* together show a register-controller circuit, Fig. 3 shows a second group selector circuit, Fig. 4 shows a final selector circuit, Fig. 5 shows part of a subscriber's line circuit, Figs. 6*a*, 6*b*, and 6*c* together show an incoming junction group selector circuit, and Figs. 7, 8, 9, and 10 illustrate various modifications to selector circuits. Fig. 11 shows how Figs. 1, 2*a*, 2*b*, 2*c*, 2*d*, 3, 4, and 5 should be assembled together, and how Figs. 6*a*, 6*b*, and 6*c* should be assembled together.

Referring firstly to the circuits of Figs. 1 to 5, the group and final selectors concerned are high-speed motor-driven uniselectors. Each has a normal position and has individual to it a driving mechanism comprising a driving electromotor and a latch electromagnet, the circuit of the electromotor being controlled in the well-known manner by a contact operated by the latch electromagnet. In Figs. 1, 3, and 4, the latch electromagnets of the first group selector, second group selector, and final selector concerned are shown at LMA, LMB, and LMC respectively, but, for simplicity, in the case of each of these selectors the remainder of the driving mechanism is not represented. The contacts NA, NB, and NC in Figs. 1, 3, and 4 are off-normal contacts of the respective selectors, each of these contacts being unoperated as shown only when the wipers of the selector concerned are in the normal position. In the case of each selector, each row of bank contacts is made up of a normal contact, 50 contacts available for outlets, and a last contact. The rows are paired, the wipers co-operating with the two rows of a pair being staggered in the well-known manner so that the selector has 104 positions. In Figs. 1, 3, and 4, the two rows of a pair are represented by concentric full line and broken line arcs, and the two staggered wipers co-operating with these rows are represented as a double-ended wiper having one end in broken line to correspond with the relevant broken line arc. As is brought out by this method of representation, the two staggered wipers co-operating with the rows of a pair are electrically directly connected. For convenience, two staggered wipers so connected will hereinafter be treated as one wiper. Treating each pair of staggered wipers in this manner, the wipers of the first group selector of Fig. 1 comprise a negative wiper, a positive wiper, a first control wiper CA, a second control wiper CAA, and a private wiper PA, and the wipers of the second group selector of Fig. 3 comprise a negative wiper, a positive wiper, a control wiper CB, and a private wiper PB, and the wipers of the final selector of Fig. 4 comprise a negative wiper, a positive wiper, and a private wiper PC. The first group selector of Fig. 1 and a line finder are individually associated to form in effect a link circuit comprising the selector and the finder, and for this reason some of the elements shown in Fig. 1 as belonging to the individual circuit of the first group selector can equally well be looked upon as forming part of the individual circuit of the associated line finder. Like the first group selector, the line finder is a high-speed motor-driven uniselector having a normal position and having individual to it a driving mechanism comprising a driving electromotor and a latch electromagnet. Wire WFA in Fig. 1 is directly connected to the private wiper of the line finder. Wires WFC and WFD are connected to the respective contacts corresponding to the line finder in the banks of two wipers of a finder concontrol coupling switch which serves to couple a line finder common control circuit to any line finder circuit of the group of line finder circuits concerned. The controls effected over wires WFC and WFD will be referred to later. The negative and positive wires on the left in Fig. 1 are directly connected to the negative and positive wipers respectively of the line finder. The individual second group selector and final selector circuits (Figs. 3 and 4) contain no apparatus additional to the selecting switches other than resistances. One or more selector homing circuits are provided for restoring the second group and final selector circuits to normal after use, each individual second group and final selector circuit being associated with only one selector homing circuit. The constitution and arrangement of the one or more selector homing circuits does not concern the present invention. All that need be explained herein in this connection is as follows. A selector homing circuit includes an access switch having outlets to each of the individual selector circuits associated with the homing circuit. The outlet to the individual second group selector circuit of Fig. 3 from the access switch of the selector homing circuit associated with this selector comprises a private wire $p^2$ directly connected to the through private wire of the selector circuit, a driving wire $l^2$ directly connected to the latch electromagnet LMB of the selector circuit, and a test wire $ht^2$ connected to positive battery over the off-normal make contact NB of the selector. This off-normal make contact NB, upon operation when the second group selector leaves normal, in addition to connecting positive battery to wire $ht^2$ also connects this battery to a start wire $hst^2$ of the selector homing circuit over a high resistance MA individual to the selector circuit. From time to time as requisite the access switch of the selector homing circuit is caused to connect with all of its outlets to individual selector circuits in turn and one or more tests are made of the condition of each of them in turn. When the access switch connects with the outlet to the individual second group selector circuit of Fig. 3, the condition of the test wire $ht^2$ indicates to the selector homing circuit whether the second group selector is off normal or not, and the condition of the private wire $p^2$ indicates to the selector homing circuit whether the second group selector is in use on a call or not. If the second group selector is in use, an earth condition or a busying tone condition, or both these conditions, will be encountered on the private wire $p^2$. If, when the access switch connects with the outlet, tests made of the condition of the outlet indicate that the second group selector is off normal but not in use, then the selector homing circuit connects the driving wire $l^2$ of the outlet to the test wire $ht^2$ over a low resistance with the result that the latch electromagnet LMB of the selector is effectively energised in a circuit including contact NB until the selector reaches normal. The wires $p^3$, $l^3$, $ht^3$, and $hst^3$ in Fig. 4 correspond to wires $p^2$, $l^2$, $ht^2$, and $hst^2$ in Fig. 3 respectively.

Figure 2A:
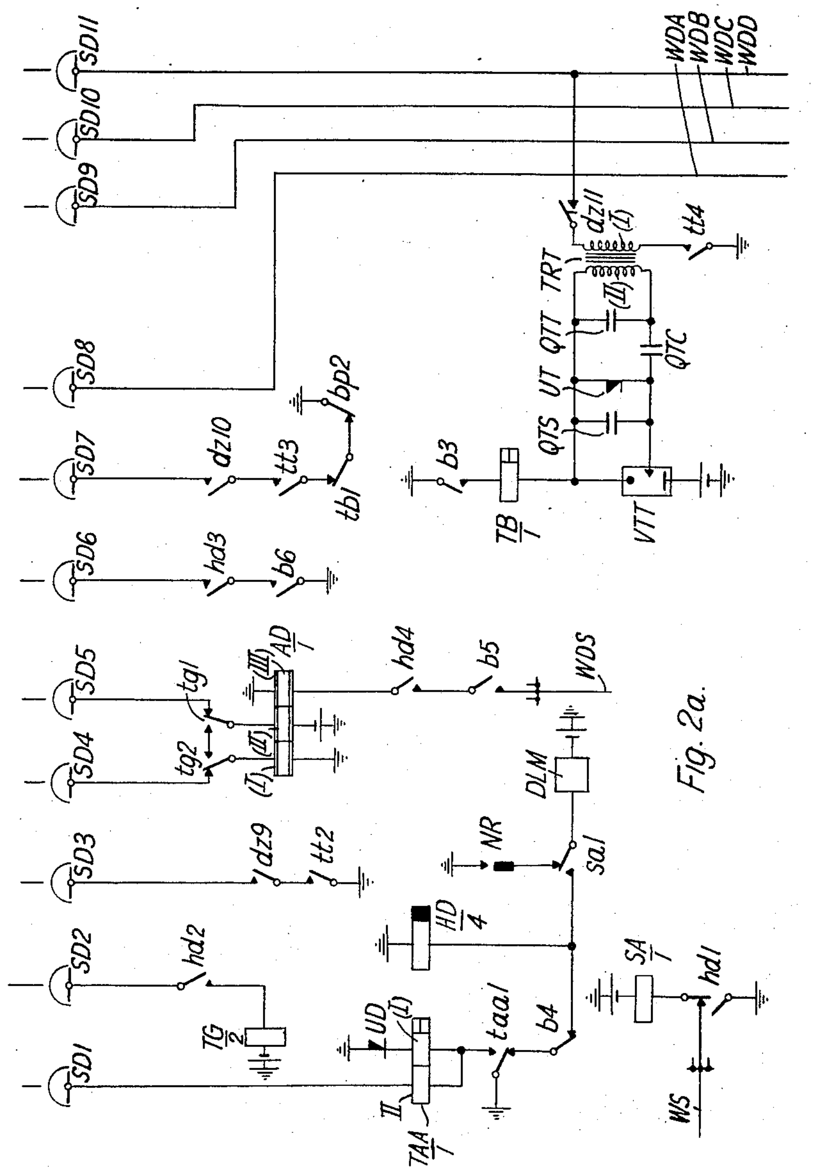
Figure 2B:
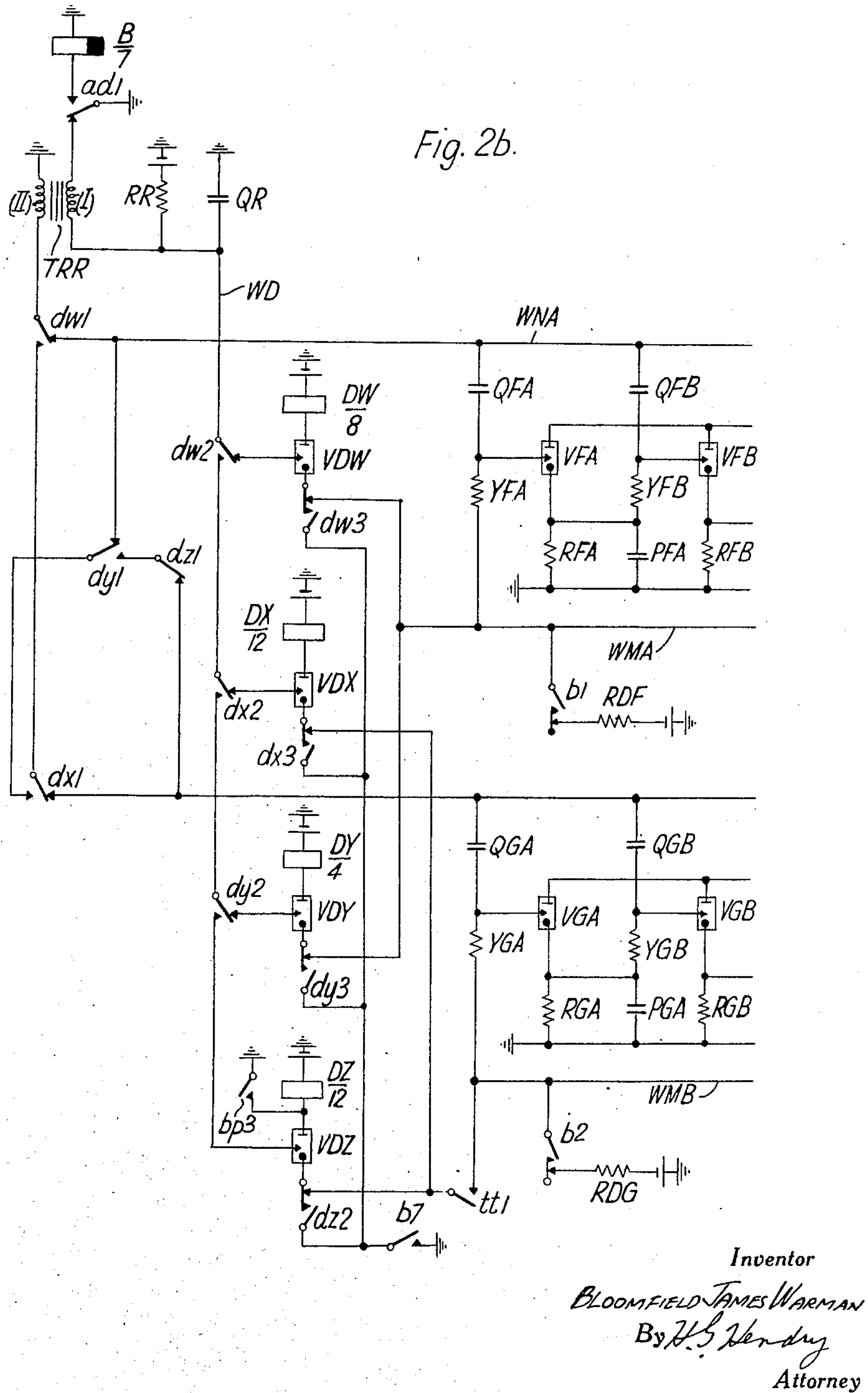
Figure 2C:
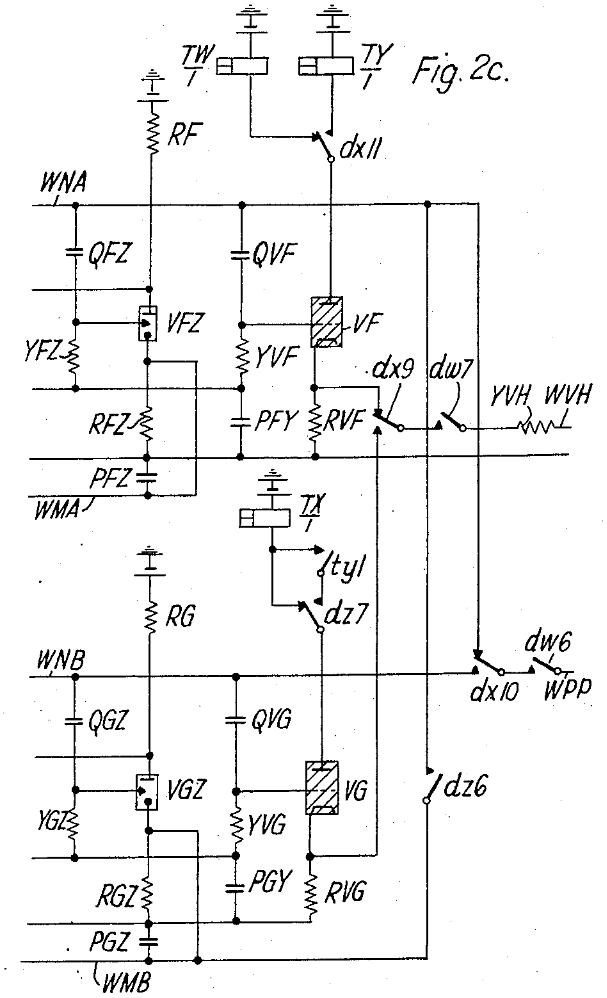

The register-controller circuit shown in Figs. 2*a*, 2*b*, and 2*c* is one of a group available in common to a plurality of first group selector circuits. When taken into use for a call it serves for controlling the setting of the first and subsequent selectors in accordance with four dialled digits, and is released to render it available for use on other calls as soon as it has completed its functions in regard to the automatic setting up of a connection. It is taken into use for a call as the result of the connection of earth to a start wire WS (Fig. 2*a*) by a line finder common control circuit, and has a coupling switch for coupling it to any first group selector circuit of the relevant group. The coupling switch is a high-speed uniselector having individual to it a driving mechanism comprising a driving electromotor and a latch electromagnet the circuit of which is controlled in the well-known manner by a contact operated by the latch electromagnet. In Fig. 2*a*, the latch electromagnet of the coupling switch is shown at DLM, but for simplicity the remainder of the driving mechanism is not represented. The contact NR is an off-normal contact of the coupling switch which is unoperated as shown only when the wipers are in the normal position. The coupling switch has eleven wipers SD1 to SD11. The start wire WS is common to the group of register-controller circuits, and upon the connection of earth to it by the previously-mentioned line finder common control circuit a start relay in each free register-controller circuit of the group is operated. In each register-controller circuit affected, the start relay on operation closes a circuit for the latch electromagnet of the coupling switch, and the coupling switch is driven in search of the outlet to the particular first group selector circuit which is individually associated with the particular line finder coupled to the line finder common control circuit at the time. For the purposes of this description, it will be assumed that the first group selector circuit of Fig. 1 is the one concerned, and that the coupling switch of the register-controller circuit of Figs. 2*a*, 2*b*, 2*c*, and 2*d* is driven in search of the outlet to this first group selector circuit and reaches the outlet in time for the register-controller illustrated to be the one which is taken into use for the call. On this assumption, upon the connection of earth to the start wire WS a start relay SA is operated in a circuit over contact *hd*1, and at contact *sa*1 closes a circuit over contacts *b*4 and *taa*1 for the latch electromagnet DLM of the coupling switch. The pertinent outlet of the coupling switch is marked by the connection of negative battery (over a testing-in resistance) to wire WFD (Fig. 1), this connection being made in the line finder common control circuit. When the coupling switch reaches the marked outlet, a high-speed test relay TAA, having a high-resistance winding (I) and a low resistance winding (II), operates to the negative battery on wire WFD, the operating circuit including a dry-plate rectifier UD, the two windings of the relay in series, and wiper SD1. Upon the operation of relay TAA, the opening of back contact *taa*1 inserts the winding of a switching relay HD in series with the latch electromagnet DLM, thereby reducing the current through this electromagnet to a value such that the electromagnet ceases to be effectively energised and initiating the slow operation of relay HD in series with the electromagnet. The closing of front contact *taa*1 short circuits rectifier UD and the high-resistance winding (I) of relay TAA, thereby marking the outlet of the coupling switch as engaged and initiating the slow operation of a relay in the line finder common control circuit. Upon operation, the last-mentioned relay causes the earth to be removed from the start wire WS, but before this happens relay HD operates and at contact *hd*1 closes a holding circuit for the start relay SA. At this time, an earth condition exists on wire WFC (Fig. 1) due to an earth connection made in the line finder common control circuit, and upon the closing of contact *hd*2 an isolating relay TG operates to the earth on wire WFC, the operating circuit including wiper SD2. Contacts *tg*1 and *tg*2 close an obvious circuit in which an impulse receiving relay AD is operated on its windings (L) and (II) in series. The circuit of a release relay B is closed at contact *ad*1. Upon the operation of relay B, contact *b*6 closes a circuit in which a line relay A in the first group selector circuit (Fig. 1) is operated on its winding (III), and which includes contact *hd*3, wiper SD6 and contacts *ha*4 and *f*3. The line relay A has a contact *a*1 (not shown in the drawings) which is included in the circuit of the line finder associated with the first group selector circuit of Fig. 1, and which upon the operation of relay A as just described completes a circuit for driving this line finder to the outlet to the calling line. After the line finder has reached, and been stopped upon, the outlet to the calling line, the isolating relay TG is released by the removal of the earth condition from wire WFC as the result of operations taking place in the line finder common control circuit. Upon the falling back of contacts *tg*1 and *tg*2, the impulse receiving relay AD is dependent for its continued energisation upon the loop over the calling line, its winding (I) being connected to the positive line wire over contact *tg*2, wiper SD4, and contact *ha*3, and its winding (II) being connected to the negative line wire over contact *tg*1, wiper SD5, and contact *ha*2. Wire WBT (Fig. 1) is connected to a source of busying tone, and the calling line is marked busy final selectors as the result of the presence of busying tone on wire WFA, the last-mentioned wire being, as previously mentioned, directly connected to the private wiper of the line finder, and being now connected over contact *a*3, a condenser QG, and a resistance YP to wire WBT. A dialling signal is reverted over the calling line by transformer action between winding (III) and windings (I) and (II) of relay AD (Fig. 2*a*), owing to the fact that a local circuit through winding (III) of this relay for dialling-signal current from an earthed source connected to wire WDS exists over contacts *hd*4 and *b*5. Trains of "break" impulses representing the "thousands," "hundreds," "tens," and "units" digits should next be received in succession by the impulse receiving relay A, the four trains being of course separated by the usual inter-train pauses.

The register-controller circuit includes first and second impulse counting chains each comprising ten impulse counting valves. For simplicity, only three impulse counting valves VFA, VFB, and VFZ of the first, and three impulse counting valves VGA, VGB, and VGZ of the second, of the chains are shown in Figs. 2*b* and 2*c*. The first impulse counting chain serves for registering the thousands digit and the tens digit, and the second impulse counting chain serves for registering the hundreds digit and the units digit. The distribution of the four digits to the two impulse counting chains in turn, and the connection of these chains to control the selective operation of the first group, second group, and final selectors in turn, is effected by a digit counting arrangement forming part of the register-controller circuit and comprising first, second, third and fourth digit counting valves VDW, VDX, VDY, and VDZ controlling first, second, third, and fourth digit counting relays DW, DX, DY, and DZ respectively. The impulse counting and digit counting valves are cold-cathode gas-filled triodes. Each impulse counting chain is arranged in the well-known manner so that its ten impulse counting valves form in effect a closed chain and are fired one at a time in turn in correspondence with impulses fed to the chain over an impulse input wire of the chain, the firing of each impulse counting valve bringing about the cessation of the discharge in the impulse counting valve fired immediately previously. Wires WNA and WNB are the impulse input wires of the first and second impulse counting chains respectively. The impulse input wire of each impulse counting chain is coupled to the control electrode of each impulse counting valve of the chain over a condenser (such as for example QFA or QFB or QFZ or QGA or QGB or QGZ) individual to the valve. The cathode of each impulse counting valve is connected to earth over a cathode resistance (such as for example RFA or RFB or RFZ or RGA or RGB or RGZ) individual to the valve and shunted by a condenser (such as for example PFA or PFY or PFZ or PGA or PGY or PGZ) and is also connected over a coupling resistance (such as for example YFB or YFZ or YFA or YGB or YGZ or YGA) to the control electrode of the immediately succeeding impulse counting valve of the impulse counting chain concerned. In the case of each impulse counting chain, the anodes of the impulse counting valves of the chain are connected to positive battery over an anode resistance (RF or RG) common to all these valves. When the release relay B of the register-controller circuit is operated as previously described, it during its operation effects (at contact *b*1 or *b*2) the transient connection of the cathode of the tenth impulse counting valve (VFZ or VGZ) of each impulse counting chain to negative battery over an individual control resistance (RDF or RDG), with the result that each chain is brought to an initial starting condition in which its tenth impulse counting valve (VFZ or VGZ) is in the discharging condition and none of its other impulse counting valves is in the discharging condition. Each impulse counting chain has associated with it a count-of-ten valve (VF or VG) which in appropriate circumstances is fired when the tenth impulse counting valve of the chain is fired. The two count-of-ten valves are hot-cathode gas-filled triodes. For simplicity the cathode-heating circuits of hot-cathode values such as VF and VG are not shown in Figs. 2*c* and 2*d*. In the case of each impulse counting chain, the control electrode of the associated count-of-ten valve is coupled to the impulse input wire of the chain over a condenser (QVF or QVG) and to the cathode of the ninth impulse counting valve of the chain over a coupling resistance (YVF or YFG), and the cathode of the associated count-of-ten valve is connected to earth over a cathode resistance (RVF or RVG). The register-controller circuit includes an impulse repeating arrangement which serves for repeating to the impulse counting chains dialled digits received by the impulse receiving relay AD, and which also, in conjunction with the impulse counting chains, controls the digit counting arrangement. This impulse repeating arrangement comprises a timing condenser QR, a charging resistance RR, and an impulse generating transformer TRR. One terminal of the timing condenser is connected to earth. The other terminal of this condenser is connected to positive battery over the charging resistance, to earth over the primary winding (I) of the impulse generating transformer TRR and back contact *ad*1, and to an input wire WD of the digit counting arrangement. The secondary winding (II) of the impulse generating transformer is connected to feed impulses generated in this winding to one or the other of the impulse counting chains in accordance with the condition of the digit counting arrangement. Shortly after the beginning of each period in which the impulse receiving relay AD remains steadily operated (e. g. the period prior to dialling after the rgeister-controller is taken into use or the period between dialled digits), the timing condenser QR becomes charged through the charging resistance RR to a degree which causes the input wire WD of the digit counting arrangement to assume a potential, positive with respect to earth and hereinafter termed the stepping potential, which in appropriate circumstances will cause the firing of a digit counting valve having its control electrode connected to this input wire, At each release of the impulse receiving relay AD in response to the break impulses of the dialled digits, the timing condenser QR is effectively discharged through the primary winding (I) of the impulse generating transformer TRR, with the result that at each such release an impulse is generated in the secondary winding (II) of this transformer and serves to step the relevant impulse counting chain. Prior to the receipt of the first (i. e. thousands) digit, the input wire WD of the digit counting arrangement assumes the stepping potential, but no immediate stepping of the digit counting arrangement takes place, since the first digit counting valve VDW, which at this time has its control electrode connected to this input wire, has for the time being a bias against firing applied to it. This bias against firing exists by reason of the facts that so long as the first digit counting relay DW is unoperated the cathode of the first digit valve VDW is connected over contact *dw*3 and wire WMA to the cathode of the tenth counting valve VFZ of the first impulse counting chain and that with the first impulse counting chain in its initial starting condition both these cathodes are therefore positive with respect to earth owing to the voltage drop in the cathode resistance RFZ of valve VFZ. The register-controller circuit includes an impulse converter which during selective movement of any selector under the control of the register-controller circuit has its input wire WQQ (Fig. 2*d*) connected to a wiper of the selector concerned. The impulse converter is an electronic two-condition device which when in a first or normal stable condition is unaffected by current flow in its input circuit due to the connection of negative battery to wire WQQ but is triggered into a second stable condition by current flow in its input circuit due to the connection of positive battery to wire WQQ, and which when in the second stable condition is unaffected by current flow in its input circuit due to the connection of positive battery to wire WQQ but is triggered into the first stable condition by current flow in its input circuit due to the connection of negative battery to wire WQQ. The output circuit of the impulse converter is arranged so that, unless the last digit counting relay DZ is operated, one effective impulse is produced in the output circuit for each change from the first or normal stable condition to the second stable condition but no effective impulse is produced in the output circuit for a change from the second stable condition to the first or normal stable condition. Each effective impulse produced in the output circuit is such as to make the output wire WPP positive with respect to earth. Upon the operation of the last digit counting relay DZ, the output circuit of the converter is modified by the closing of contact *dz*8 so that an effective impulse is produced therein in respect of each change of condition. The impulse converter comprises two hot-cathode gas-filled triodes VP and VQ having a common anode circuit of such resistance that a discharge can only be sustained in one of the valves at a time. The common anode circuit includes a resistance YLL and a condenser QJ. The anode circuit of the triode VP includes contacts *dw*8, *dx*12, and *dz*12, which serve to ensure that the impulse converter is restored to the first or normal stable condition when requisite. The input wire WQQ of the converter is connected to earth over the primary winding (I) of a transformer TRP associated with the triode VP in series with a rectifier UP of the dry-plate type connected to oppose the flow of direct current from negative battery, and is also connected to earth over the primary winding (I) of a similar transformer TRQ associated with the triode VQ in series with a rectifier UQ of the dry-plate type connected to oppose the flow of direct current from positive battery. The secondary windings (II) of the two transformers TRP and TRQ are connected in the grid circuits of the respective valves VP and VQ in such sense that rise of current through the primary winding (I) of transformer TRP tends to make the grid of valve VP more positive and rise of current through the primary winding (I) of transformer TRQ tends to make the grid of valve VQ more positive. Each valve has a cathode load resistance (YPP or YLL), and the output impulses are derived over a coupling condenser QK from the cathode of valve VP unless the last digit counting relay DZ is operated, in which case the output impulses are derived from the cathodes of both valves over coupling condensers QK and QL.

Upon the receipt of the thousands digit by the impulse receiving relay AD, the impulse generating transformer TRR feeds the relevant number of impulses to wire WNA over back contact *dw*1, and the first impulse counting chain is stepped to register the value of the digit, and shortly after the receipt of the last dialled impulse representing the digit the input wire WD of the digit counting arrangement assumes the stepping potential referred to previously and the first digit counting valve VDW thereupon fires and brings about the operation of the first digit counting relay DW. Since the first impulse counting chain has been stepped from its initial starting condition, this valve no longer has a bias against firing applied to it. Upon the operation of the first digit counting relay DW, the input wire WQQ of the impulse converter is connected over contacts *dw*5 and *dx*5, wire WDB, and wiper SD9 of the coupling switch to the first control wiper CA of the first group selector. Contacts in the bank of the first control wiper CA of the first group selector which are associated with outlets to second group selector circuits are connected to negative battery over the windings of the latch electromagnets (such as LMB) of the respective second group selectors. Preceding each group of outlets to second group selectors other than the group of outlets first encountered is a control outlet. Contacts in the bank of the first control wiper CA of the first group selector which are associated with the control outlets may conveniently be termed pilot contacts and are connected to positive battery over a resistance RPA. Upon the operation of the first digit counting relay DW the latch electromagnet LMA of the first group selector is energised over contacts *tx*1, *tw*1, *dw*4, and *dx*4, wire WDA, and wiper SD8 of the coupling switch, and in general, wire WPP being connected to wire WNA over contacts *dw*6 and *dx* 10, the first impulse counting chain is stepped on, by complementary impulses constituted by output impulses of the impulse converter and produced each time the first control wiper CA of the first group selector encounters a pilot contact, until the first impulse counting chain registers a total of ten. The impulse converter serves to prevent any spurious impulses which may be produced by bounce of a control wiper such as CA from causing incorrect setting of a selector. Upon registration of a total of ten as just mentioned, the count-of-ten valve VF associated with the first impulse counting chain is fired and brings about the operation of a first high-speed control relay TW in the register-controller circuit. This control relay TW upon operation by opening its contact *tw*1 renders further energisation of the latch electromagnet LMA of the first group selector dependent upon a circuit over the contact *t*1 of a high-speed test relay T in the register-controller circuit. Until the second digit counting relay DX is operated, this high speed test relay T is connected to test for negative battery through a relatively low resistance (e. g. 550 ohms), its operating circuit being earth, back contact *dx*8 of the second digit counting relay, a rectifier UJ poled to pass current flowing from this earth to negative battery, a first terminal tag GA of itself, a first high resistance operating winding (I) of itself, a second terminal tag GB of itself, a low resistance holding winding (III) of itself, a third terminal tag GC of itself, back contact *dx*7 of the second digit counting relay, contact *dz*5, wire WDD, wiper SD11 of the coupling switch, the private wiper PA of the first group selector, negative battery in a free second group selector circuit (over the private wiper PB and a relatively low resistance RTB, Fig. 3). In a busy second group selector circuit the private wiper PB will either be connected to positive battery (over a resistance RTC, Fig. 4, or YC, Fig. 5) or will be connected to negative battery over a high resistance (YC) or to earth over a low resistance. If subsequent to the operation of the first high speed control relay TW the first group selector encounters a free outlet in the relevant group, the high-speed test relay T operates and at its contact *t1* inserts an auxiliary test relay TT into the circuit of the latch electromagnet LMA of this selector and brings the selector to rest on the outlet. The high-speed test relay T on operation at its contact *t1* short circuits its own high resistance winding (I) to mark the outlet busy.

Whenever the first group selector is off normal, a relay LBR is operated on its winding (II), and at its contact (not shown in the drawings) serves to mark the associated line finder circuit busy. Relay LBR has a winding (I), not illustrated, which is energised whenever the relevant line finder is off normal.

If subsequent to the operation of the first high speed control relay TW the first group selector fails to find a free outlet in the relevant group, a count-of-eleven valve VH in the register-controller is fired by a further complementary impulse produced by the impulse converter as the result of the encountering of a further pilot contact by the first control wiper CA of the first group selector. The control electrode of the count-of-eleven valve VH is biased preparatory to such firing by being coupled to the cathode of valve VF over contacts *dx9* and *dw7*, resistance YVH, and wire WVH. This count-of-eleven valve VH is a hot-cathode gas-filled triode, and it upon firing brings about the operation of a high speed count-of-eleven relay TD. This count-of-eleven relay TD upon operation at its contact *td1* brings about the stopping of the first group selector upon the control outlet concerned and operates a busy relay BP. Contact *bp1* opens the circuit of the latch electromagnet LMA of the first group selector and closes an alternative circuit for relay TT. Contact *bp3* operates the fourth digit counting relay DZ. A slow operating holding relay HA in the first group selector circuit is operated on its operating winding (I) in a circuit over contacts *tt2* and *dz9* and wiper SD3 of the coupling switch. On operation, relay HA locks up on its holding winding (II) in a circuit over contacts *ha1* and *a2*, and at its contacts *ha2* and *ha3* releases relay AD in the register-controller circuit and renders the line relay A dependent for its continued operation on the energisation of its windings (I) and (II) over the calling loop. The release of relay AD initiates the restoration to normal of the register-controller circuit. A busy signal is reverted over the calling line by transformer action between winding (III) and windings (I) and (II) of relay A, owing to the fact that a circuit through winding (III) of this relay for busy-signal current from a source connected to wire WBS exists over contacts *d4*, *ha4*, and *f3*. The source of busy-signal current is connected to negative battery.

Assuming that congestion is not encountered at the first and second group selectors, upon the receipt of the hundreds digit by the impulse receiving relay AD, the impulse generating transformer TRR feeds the relevant number of impulses to wire WNB over front contact *dw1* and back contact *dx1*, and the second impulse counting chain is stepped to register the value of the digit. Shortly after the receipt of the last dialled impulse representing the digit the input wire WD of the digit counting arrangement assumes the stepping potential referred to previously and the second digit counting valve VDX, its control electrode being connected to wire WD over contacts *dx2* and *dw2* and its cathode being connected to earth over contact *tt1*, wire WMB, and resistance RGZ, fires and brings about the operation of the second digit counting relay DX. Premature operation of the second digit counting relay DX is prevented in the same manner as has been described in connection with the first digit counting relay DW, the bias against premature firing being provided in this instance by a voltage drop across resistance RGZ. Upon the operation of the second digit counting relay DX, the input wire WQQ of the impulse converter is connected over contacts *dw5*, *dx5*, and *dz4*, wire WDC, wiper SD10 of the coupling switch, and the second control wiper CAA of the first group selector to a control wiper CB (Fig. 3) of the second group selector, and the count-of-ten valve VF associated with the first impulse counting chain is extinguished by the changing over of contact *dx11* and connected to control a third high speed control relay TY in the register-controller circuit instead of the first high speed control relay TW. The last-mentioned relay is consequently released and the auxiliary test relay TT short circuited, and the latch electromagnet LMB of the second group selector is energised over contacts *tx1*, *tw1*, *dw4*, *dx4*, *dz3*, and *dy4*, wire WDB, wiper SD9 of the coupling switch and the first control wiper CA of the first group selector. Contacts in the bank of the control wiper CB of the second group selector which are associated with the control outlets (i. e. pilot contacts) are connected to positive battery over a resistance RPB. In general, wire WPP being connected to wire WNB, the second impulse counting chain is stepped on, by complementary impulses constituted by output impulses of the impulse converter and produced each time the control wiper CB of the second group selector encounters a pilot contact, until the second impulse counting chain registers a total of ten. Upon such registration of a total of ten, the count-of-ten valve VG associated with the second impulse counting chain is fired and brings about the operation of a second high-speed control relay TX in the register-controller circuit. This control relay upon operation by opening its contact *tx1* renders further energisation of the latch electromagnet LMB of the second group selector dependent upon the high-speed test relay T previously mentioned, but in this case, since the second digit counting relay DX is operated, relay T is connected to test for positive battery through a relatively low resistance (e. g. 550 ohms). The operating circuit for relay T in this case is earth, front contact *dx8* of the second digit counting relay, a rectifier UK poled to pass current flowing to this earth from positive battery, a fourth terminal tag GD of itself, a second high resistance operating winding (II) of itself, its third terminal tag GC, its low resistance holding winding (III), its second terminal tag GB, front contact *dx7* of the second digit counting relay, contact *dz5*, wire WDD, wiper SD11 of the coupling switch, the private wipers PA and PB of the first and second group selectors, positive battery in a free final selector circuit (over the private wiper PC and a relatively low resistance RTC, Fig. 4). In a busy final selector circuit the private wiper PC will either be connected to positive or negative battery over a high resistance YC (e. g. 3000 ohms), or to earth over a low resistance. The circuit arrangement of the high-speed test relay T is such that a four-terminal three-winding relay serves for testing for negative or positive battery as required and yet the flux in the relay is always in the same direction, when the second group selector encounters a free outlet in the relevant group, the high-speed test relay T operates and at its contact *t1* inserts the auxiliary test relay TT into the circuit of the latch electromagnet LMB of this selector and brings the selector to rest on the outlet. Upon the receipt of the tens digit, since the secondary winding (II) of transformer TRR is connected to wire WNA over contacts *dw1*, *dx1*, and *dy1*, the first impulse counting chain is stepped to register the value of the digit. Shortly after the receipt of the last dialled impulse representing the digit the third digit counting valve VDY, its control electrode being connected to wire WD over contacts *dy2*, *dx2*, and *dw2*, fires and brings about the operation of the third digit counting relay DY. Upon the receipt of the units digit, the second impulse counting chain is stepped to register the value of the digit, and this is followed by the firing of the fourth digit counting valve VDZ and the operation of the fourth digit counting relay DZ. Upon the operation of the fourth digit counting relay DZ, the high-speed test relay T is operated in a circuit, over front contact *dz*5 and resistance RM, local to the register-controller, and the previously fired count-of-ten valve VG associated with the second impulse counting chain is extinguished and the second high-speed control relay TX is released. Also, the impulse input wire WNA of the first impulse counting chain is connected over contact *dz*6 to the cathode of the tenth counting valve VGZ of the second impulse counting chain, and the latch electromagnet LMC of the final selector is energised over contacts *tx*1, *tw*1, *dw*4, *dx*4 and *dz*3, wire WDC, wiper SD10 of the coupling switch, the second control wiper CAA of the first group selector and the control wiper CB of the second group selector, and the input wire WQQ of the impulse converter is connected over contacts *dw*5, *dx*5, and *dz*4, wire WDD, wiper SD11 of the coupling switch, and the private wipers PA and PB of the first and second group selectors to the private wiper PC of the final selector. Contacts in the bank of the private wiper PC of the final selector other than the normal contact are connected in the relevant line circuits over high resistances YC (e. g. each of 3000 ohms) to either negative battery or positive battery, odd contacts from normal being connected to negative battery and the remaining contacts to positive battery. In general, wire WPP being connected to wire WNB, upon the operation of the fourth digit counting relay DZ the second impulse counting chain is stepped on, by complementary impulses constituted by output impulses of the impulse converter and produced each time the private wiper PC of the final selector encounters a further bank contact, until it has registered a total of ten the number of times necessary to produce the condition that both the first and second impulse counting chains are registering a total of ten. At each registration of a total of ten by the second impulse counting chain during this operation, a complementary impulse is fed over contact *dz*6 from the cathode of the tenth counting valve VGZ of this chain to the impulse input wire WNA of the first impulse counting chain. Upon the registration of a total of ten by the first impulse counting chain as a result of the complementary impulses thus fed to it, the count-of-ten valve VF associated with the chain is fired and brings about the operation of the third high speed control relay TY. This operation of the third high speed control relay TY prepares at contact *ty*1 the circuit of the count-of-ten valve VG associated with the second impulse counting chain for firing and for bringing about the further operation of the second high-speed control relay TX. The next time the second impulse counting chain registers a total of ten, the second high-speed control relay TX is operated and inserts the auxiliary test relay TT into the circuit of the latch electromagnet LMC of the final selector and brings this selector to rest on the outlet to the called subscriber. It will be clear upon consideration that this method of setting the final selector necessitates arranging that the outlets of the final selector taken in order from normal give access to subscribers' lines in reverse numerical order. Upon the operation of the auxiliary test relay TT, a circuit for the slow operating holding relay HA in the first group selector circuit is completed over contacts *tt*2 and *dz*9, and at the same time by the closing of contact *tt*4 a tone detecting circuit connected to the private wiper PC of the final selector over contact *dz*11, wiper SD11 of the coupling switch, and the private wipers PA and PB of the first and second group selectors is rendered effective. If the called subscriber's line is free, a busying tone will not be present on its private wire.

Assuming for the moment that the called subscriber's line is free, an answering supervisory relay D in the first group selector circuit is operated on its winding (III) in a circuit over contacts *bp*2, *tb*1, *tt*3, and *dz*10, wiper SD7, and contacts *ha*5, *d*1, and *a*5, with the result that ringing current from an earthed source connected to wire WRC is fed to the line over the operating winding (I) of a ring-tripping relay F in the first group selector circuit. The operation of contact *d*5 of the answering supervisory relay D applies busying tone from the source connected to wire WBT to the private wire of the called subscriber's line over a resistance YQ, a condenser QH, and the private wipers PA, PB, and PC of the first and second group and final selectors. The operation of the holding relay HA renders continued operation of the line relay A dependent upon the calling loop, and initiates the release of the register-controller circuit by releasing relay AD. Relay D on operation locks up on its winding (III) in a circuit over contacts *f*2, *d*1, and *a*5. When the called subscriber replies to the call, the ring-tripping relay F operates on its operating winding (I) in the circuit earthed source of ringing current connected to wire WRC, contact *d*3, winding (I) of the relay, contact *f*5, the positive wipers of the first and second group selectors and the final selector, the loop over the called line, the negative wipers of the selectors, contacts *f*4 and *d*2, a resistance RN, negative battery. Relay F on operation locks up on its holding winding (II) in a circuit over contacts *ha*6 and *f*1, and at contacts *f*4 and *f*5 completes the conversational circuit between the calling and called lines. Relays A and D and condensers QBB constitute the feeding bridge for the connection.

The tone detecting circuit previously referred to comprises an input transformer TRT, a tuning condenser QTT connected across the secondary winding (II) of this transformer, a coupling condenser QTC, a dry-plate rectifier UT, a smoothing condenser QTS, a cold-cathode gas-filled triode VTT, and a high-speed busy relay TB. The tuning condenser QTT serves to tune the secondary circuit of the input transformer TRT to the frequency of the busying tone. The gas-filled triode VTT is fired when the rectifier UT gives an effective output as the result of a flow of busying tone current through the primary winding (I) of transformer TRT, and upon firing operates the busy relay TB, which is connected in its cathode circuit in series with contact *b*3. If the called subscriber's line is not free when the tone detecting circuit is rendered effective by the closing of contact *tt*4 as previously described, then the busy relay TB is operated and at its contact *tb*1 opens the operating circuit of the answering supervisory relay D to prevent the operation of this relay. In these circumstances, the operation of the holding relay AA in the first group selector circuit causes a busy signal from the source connected to wire WBS to be reverted, since contact *d*4 is unoperated.

Figure 6A:
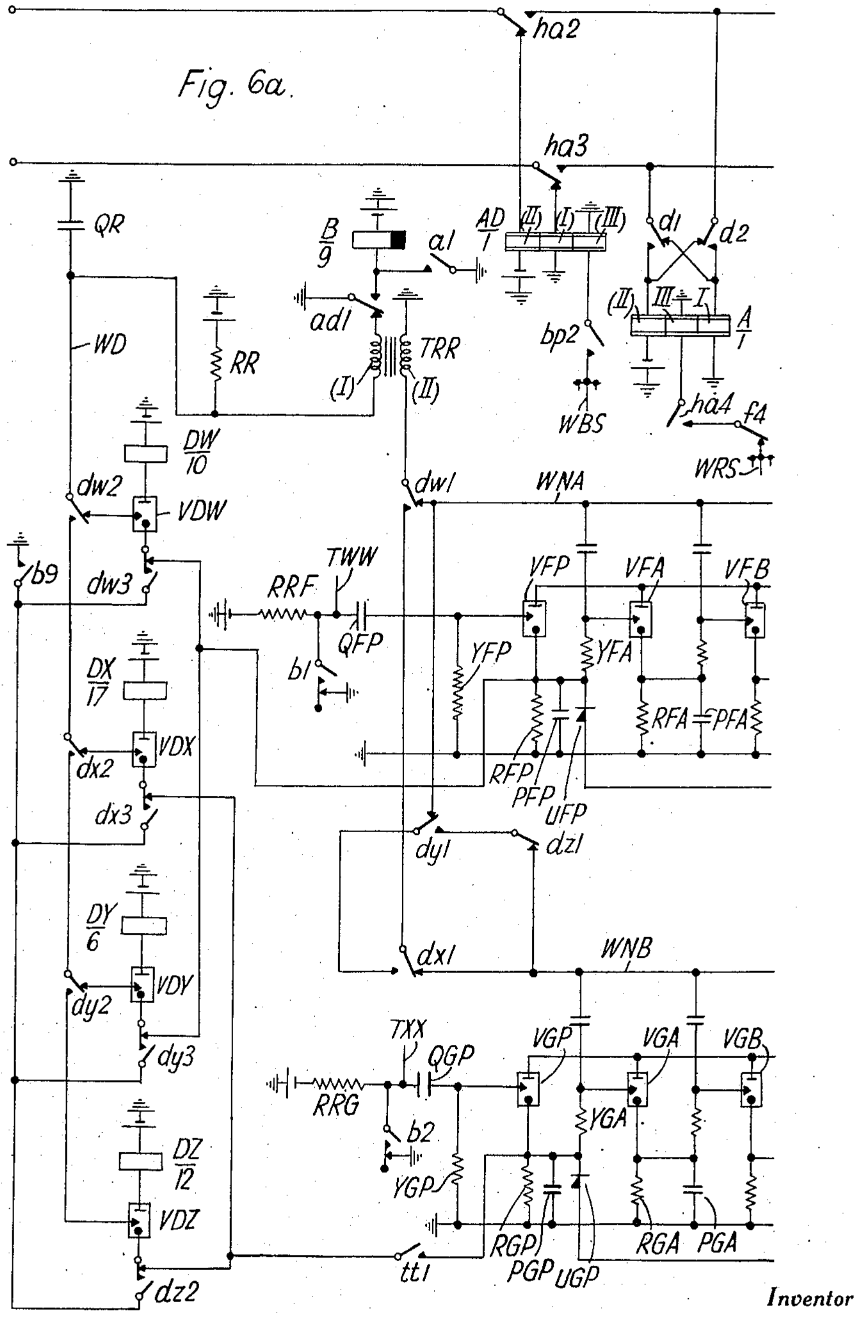
Figure 6B:
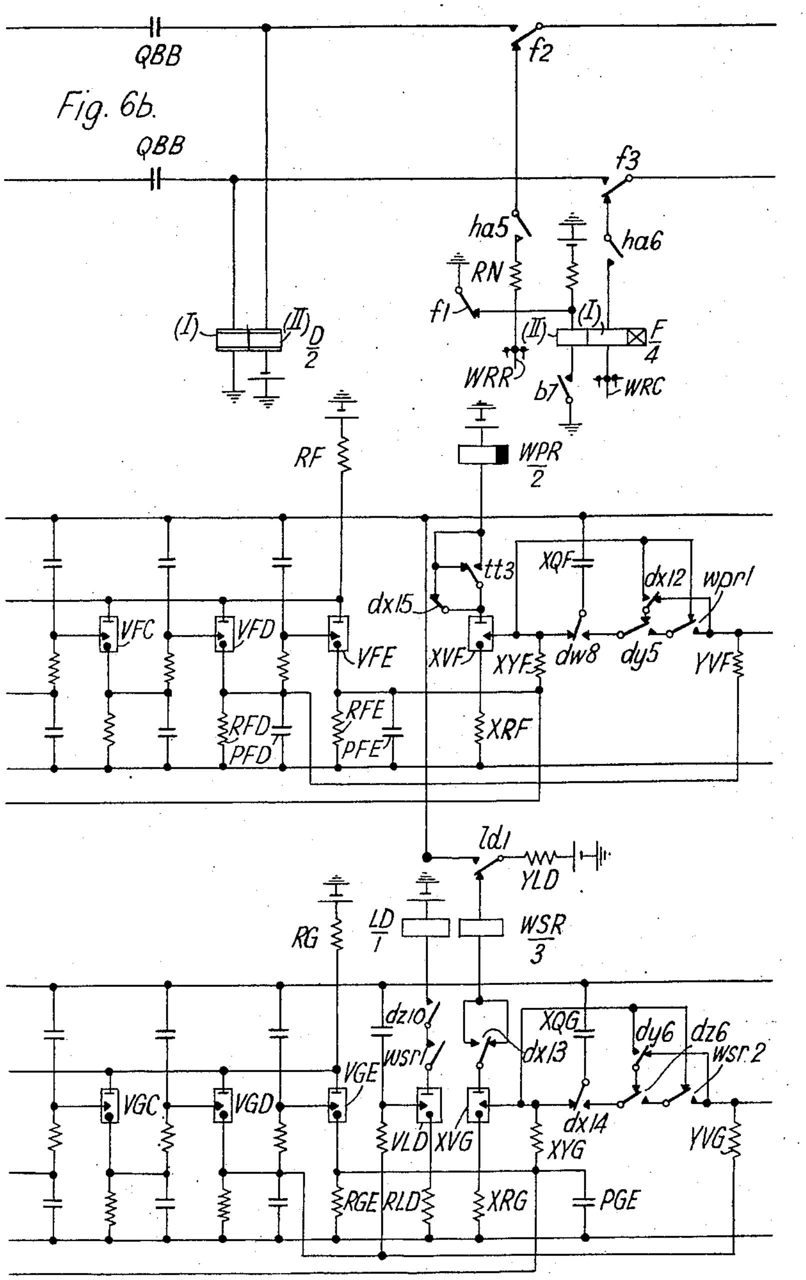
Figure 6C:
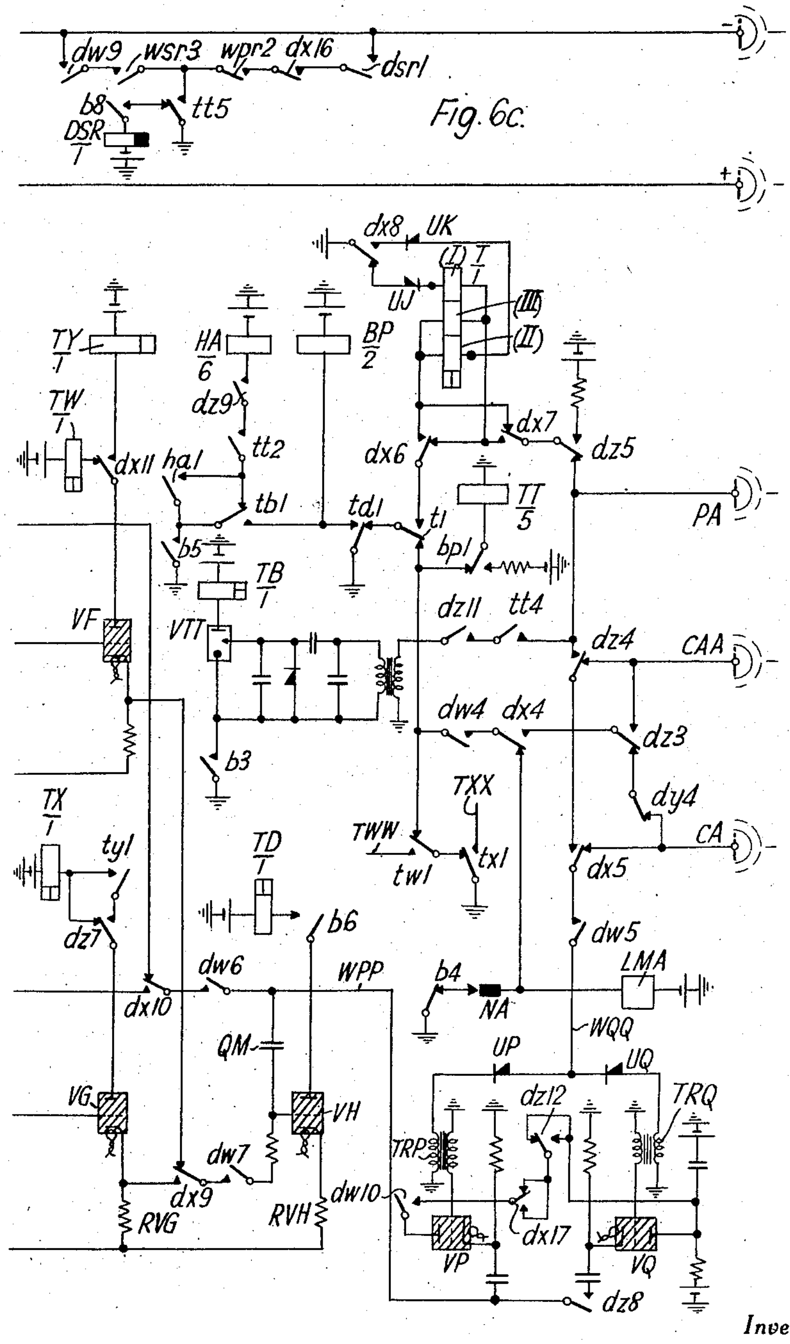

Referring now to the incoming junction group selector circuit illustrated in Figs. 6*a*, 6*b*, and 6*c*, this is in many respects a combination of circuit elements of the first group selector circuit of Fig. 1 with circuit elements of the register-controller circuit of Figs. 2*a*, 2*b*, 2*c* and 2*d*, and therefore the operation of many of the circuit elements of Figs. 6*a*, 6*b*, and 6*c* need not be referred to in detail. In referring to Figs. 6*a*, 6*b*, and 6*c*, Fig. 6*b* should be placed to the right of Fig. 6*a*, and Fig. 6*c* should be placed to the right of Fig. 6*b*, and wires TWW and TXX in Fig. 6*a* should be considered as being connected to the respective correspondingly designated wires in Fig. 6*c*. The line wires of the incoming junction are connected to the terminals designated negative and positive at the top left-hand corner of Fig. 6*a*. When the junction is taken into use for a call, the impulse receiving relay AD operates over the calling loop and at its contact *ad*1 operates the release relay B. Upon the receipt of the thousands digit by the impulse receiving relay AD, the impulse generating transformer TRR feeds the relevant number of impulses to wire WNA, and a first impulse counting chain is stepped to register the value of the digit. In the case of the circuit now being considered, the first impulse counting chain comprises five impulse counting valves VFA, VFB, VFC, VFD, and VFE and is arranged in the well-known manner so that its five impulse counting valves form in effect a closed chain and are fired one at a time in turn in correspondence with impulses fed to the chain over its impulse input wire WNA. A second impulse counting chain comprises five impulse counting valves VGA, VGB, VGC, VGD, and VGE, and is similarly arranged. In the case of the circuit now being considered, the arrangements for bringing the impulse counting chains to an initial starting condition comprise two extra valves VFP and VGP of the same type as the impulse counting valves. When the release relay B is operated, it during its operation effects at contact *b1* the transient connection to earth of the junction between a resistance RRF and a condenser QFP, with the result that the condenser QFP, normally charged through the resistance RRF and a resistance YFP, is discharged through the resistance YFP. The resulting voltage drop across the resistance YFP makes the control electrode of the valve VFP sufficiently positive to fire the valve and bring the first impulse counting chain to an initial starting condition in which none of the impulse counting valves VFA, VFB, VFC, VFD, and VFE is in the discharging condition, but in which the control electrode of the first impulse counting valve VFA is positively biased with respect to the cathode by reason of the voltage drop across the cathode resistance RFP of the valve VFP. The resistance RFP is shunted by a condenser PFP, and a rectifier UFP of the dry-plate type serves to prevent the voltage drop across the resistance RFP from materially affecting the cathode potential of the valve VFE. When the release relay B is operated, contact *b2*, a resistance RRG, a condenser QGP, a resistance YGP, the valve VGP, a resistance RGP, a condenser PGP, and a rectifier UGP serve correspondingly to bring the second impulse counting chain to an initial starting condition in which none of the impulse counting valves VGA, VGB, VGC, VGD, and VGE is in the discharging condition, but in which the control electrode of the first impulse counting valve VGA is positively biased with respect to the cathode. If the thousands digit received by the impulse receiving relay AD has one of the values "6" to "0," then an additional counting valve XVF associated with the first impulse counting chain is fired when the impulse counting valve VFA is fired for the second time in respect of the digit in response to the sixth of the six or more impulses fed to wire WNA in respect of the digit. The control electrode of valve XVF is normally coupled to wire WNA over back contact *dw8* and a condenser XQF, and is coupled to the cathode of the impulse counting valve VFE over a coupling resistance XYF. The cathode circuit of valve XVF comprises a cathode resistance XRF. When the additional counting valve XVF is fired as just mentioned a discriminating relay WPR is operated over contacts *dx15* and *tt3* in parallel to register the fact that the thousands digit has one of the values "6" to "0." Shortly after the receipt of the last impulse of the thousands digit the digit counting valve VDW fires and brings about the operation of the first digit counting relay DW. Upon the operation of relay DW, the input wire WQQ of an impulse converter is connected over contacts *dw5* and *dx5* to the first control wiper CA of the incoming junction group selector, and the latch electromagnet LMA of this selector is energised over contacts *tx1*, *tw1*, *dw4*, and *dx4*. In general, the output wire WPP of the impulse converter being connected to wire WNA over contacts *dw6* and *dx10*, the first impulse counting chain is stepped on, by complementary impulses constituted by output impulses of the impulse converter and produced each time the wiper CA encounters a pilot contact, until the first impulse counting chain has in effect registered a total of five or ten, depending upon whether the thousands digit has one of the values "1" to "5," or has one of the values "6" to "0," respectively. It will be clear from what has been said that the registration of the requisite total is denoted by the attainment by the first impulse counting chain of the condition in which valve VFE is fired. Upon registration of the requisite total, an end-of-count valve VF associated with the first impulse counting chain is fired when valve VFE is fired, the control electrode of valve VF being at this time connected to wire WNA over contacts *dx12*, *dy5*, and *dw8*, and condenser XQF. The incoming junction group selector has only five groups of outlets, namely a group corresponding to thousands digits "1" and "6," a group corresponding to thousands digits "2" and "7" a group corresponding to thousands digits "3" and "8," a group corresponding to thousands digits "4" and "9," and a group corresponding to thousands digits "5" and "0." The necessary selection as regards the thousand digit actually involved is effected at the final selector in dependence upon whether or not earth is connected over contact *wpr2* (Fig. 6*c*) to the negative wire at the time concerned. When the end-of-count valve VF is fired as just mentioned, a first high-speed control relay TW is operated and at its contact *tw1* renders further energisation of the latch electromagnet LMA dependent upon the high-speed test relay T, and fires the valve VFP to restore the first impulse counting chain to the initial starting condition. Until the second digit counting relay DX is operated, relay T is connected to test for negative battery over the private wiper PA of the incoming junction group selector. If subsequent to the operation of relay TW the incoming junction group selector encounters a free outlet in the relevant group, the test relay T operates and at its contact *t1* inserts an auxiliary test relay TT into the circuit of the latch electromagnet LMA and brings the selector to rest on the outlet, and short circuits its own high resistance winding (I) to mark the outlet busy.

Figure 2D:
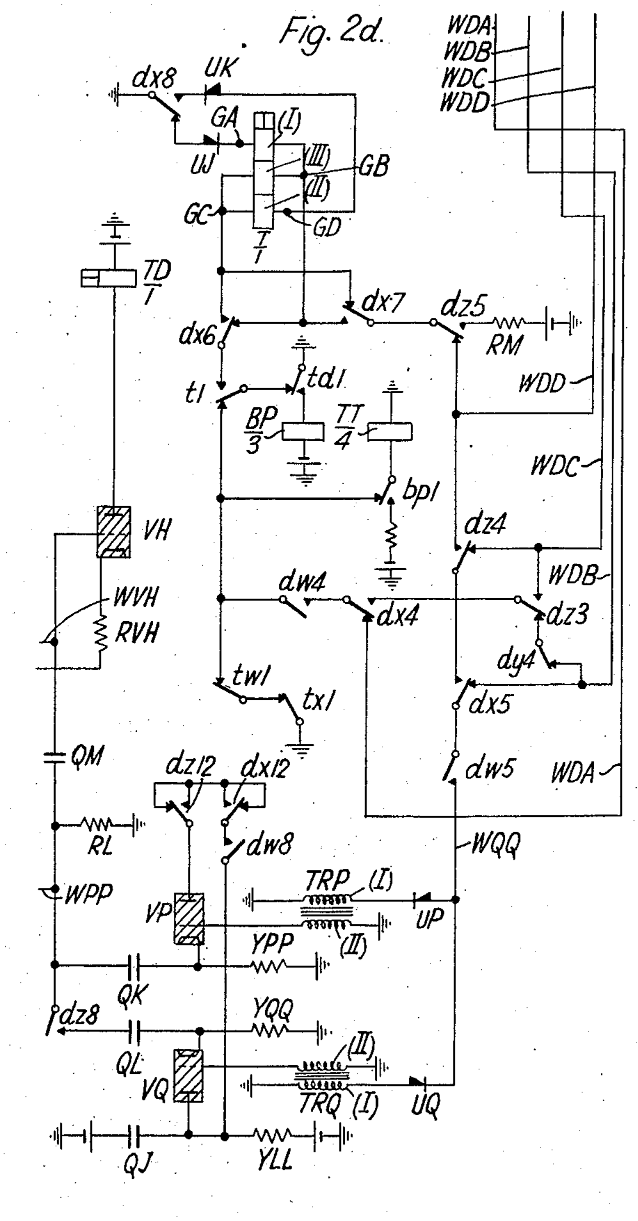
Figures 3, 4, 5:
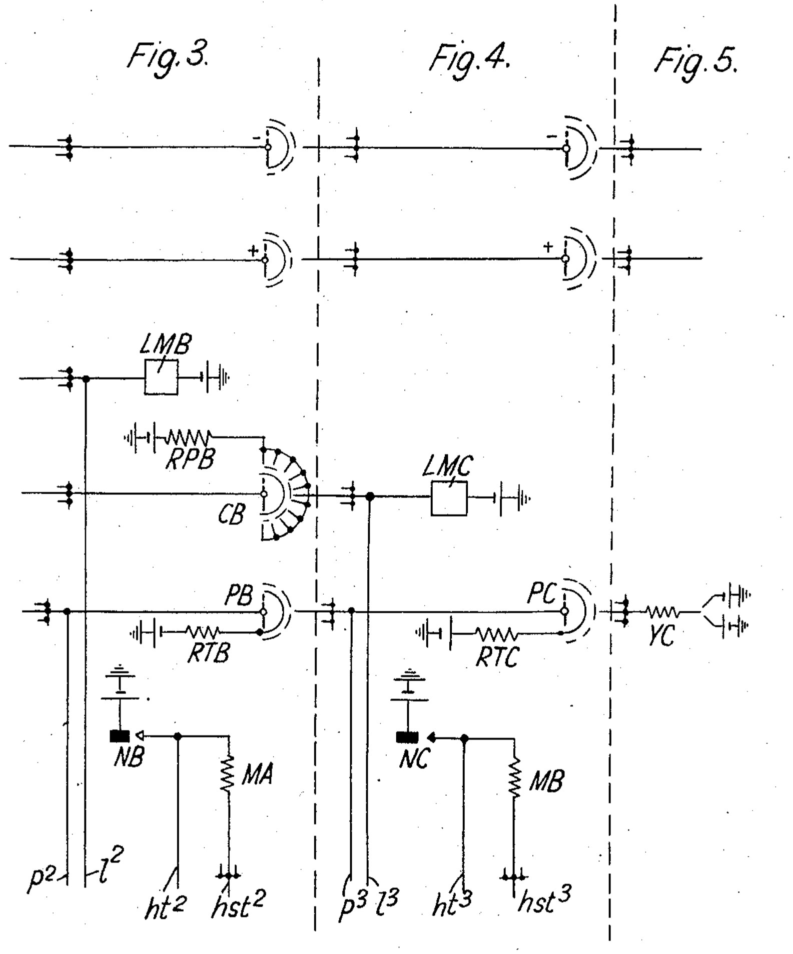

If subsequent to the operation of relay TW the incoming junction group selector fails to find a free outlet in the relevant group, a valve VH, corresponding to the count-of-eleven valve VH in Fig. 2*d*, is fired by the further complementary impulse produced by the impulse converter as the result of the encountering of a further pilot contact by wiper CA. Valve VH upon firing brings about the operation of a high-speed relay TD in the anode circuit. Upon operation relay TD at its contact *td1* brings about the stopping of the incoming junction group selector upon the control outlet concerned and operates a busy relay BP. Contact *bp1* opens the circuit of the latch electromagnet LMA and closes an alternative circuit for relay TT. A busy signal is reverted over the incoming junction by transformer action between winding (III) and windings (I) and (II) of relay AD, owing to the fact that a circuit through winding (III) of this relay for busy-signal current from an earthed source connected to wire WBS exists over contact *bp2*.

Assuming that congestion is not encountered at the incoming junction group selector and at an immediately succeeding group selector which is a pre-final one, upon the receipt of the hundreds digit by the impulse receiving relay AD the impulse generating transformer TRR feeds the relevant number of impulses to wire WNB over front contact *dw1*, and the second impulse counting chain is stepped to register the value of the digit. If the hundreds digit has one of the values "6" to "0," then an additional counting valve XVG associated with the second impulse counting chain is fired when the impulse counting valve VGA is fired for the second time in respect of the digit. The control electrode of valve XVG is normally coupled to wire WNB over back contact *dx14* and a condenser XQG, and is coupled to the cathode of the impulse counting valve VGE over a coupling resistance XYG. When valve XVG is so fired, a discriminating relay WSR is operated. Shortly after the receipt of the last impulse representing the digit the second digit counting valve VDX fires and brings about the operation of the second digit counting relay DX. Upon the operation of relay DX, the input wire WQQ of the impulse converter is connected over contacts *dw5*, *dx5*, and *dz4* to the second control wiper CAA of the incoming junction group selector and the end-of-count valve VF is extinguished by the changing over of contact *dx* 11 and connected to control a third high-speed control relay TY instead of relay TW. Relay TW is consequently released and relay TT short circuited, and the latch electromagnet of the said succeeding group selector is energised over contacts *tx*1, *tw*1, *dw*4, *dx*4, *dz*3, and *dy*4, and the first control wiper CA. In general, wire WPP being connected to wire WNB over contacts *dw*6 and *dx*10, the second impulse counting chain is stepped on, by complementary impulses constituted by output impulses of the impulse converter and produced each time the control wiper of the said succeeding group selector encounters a pilot contact, until the second impulse counting chain has in effect registered a total of five or ten, depending upon whether the hundreds digit has one of the values "1" to "5," or has one of the values "6" to "0" respectively. It will be clear from what has been said that the registration of the requisite total is denoted by the attainment by the second impulse counting chain of the condition in which valve VGE is fired. Upon registration of the requisite total, an end-of-count valve VG associated with the second impulse counting chain is fired when valve VGE is fired, the control electrode of valve VG being at this time connected to wire WNB over contacts *dy*6, *dz*6, and *dx*14, and condenser XQG. The said succeeding group selector has two sets of wipers, the set used depending upon whether earth is or is not connected to its incoming negative wire for a brief period before it is driven from normal, the circuit in which earth is so connected being over contacts *tt*5, *wsr*3, and *sw*9. There are five groups of outlets in the banks of each set of wipers. The groups in the banks of one set of wipers are groups for which the hundreds digit is "1" to "5," and the groups in the bank of the other set of wipers are groups for which the hundreds digit is "6" to "0." When the end-of-count valve VG is fired as just mentioned, a second high-speed control relay TX is operated and at its contact *tx*1 renders further energisation of the latch electromagnet of the said succeeding group selector dependent upon the test relay T, but in this case, since the second digit counting relay DX is operated, relay T is connected to test for positive battery. The closing of front contact *tx*1 fires the valve VGP to restore the second impulse counting chain to the initial starting condition. When the said succeeding group selector encounters a free outlet in the relevant group, relay T operates and at its contact *t*1 inserts the auxiliary test relay TT into the circuit of the latch electromagnet of this selector and brings the selector to rest on the outlet, which is an outlet to a final selector. The final selector has two sets of wipers, the set used depending upon whether earth is or is not connected to its incoming negative wire for a brief period before it is driven from normal, the circuit in which earth is so connected being over contacts *tt*5, *wpr*2, *dx*16, and *dsr*1, relay DSR being a slow releasing relay which is operated in a circuit over contact *b*8 during periods in which relay TT is unoperated. In the case where earth is so connected it is removed by the release of relays WPR and DSR initiated by the operation of relay TT. There are 100 outlets to subscriber's line circuits in the banks of each set of wipers. The outlets in the banks of one set of wipers are for lines for which the thousands digit has one value, and the outlets in the banks of the other set of wipers are for lines for which the thousands digit has another value, the possible pairs of thousands digits being "1" and "6," "2" and "7," "3" and "8," "4" and "9," and "5" and "0." Upon the receipt of the tens digit by the impulse receiving relay AD the impulse generating transformer TRR feeds the relevant number of impulses to wire WNA over front contacts *dw*1 and *dx*1, and the first impulse counting chain is stepped to register the value of the digit. If the tens digit has one of the values "6" to "0," then the additional counting valve XVF is fired, it having, if fired in response to the thousands digit, been extinguished upon the changing over of contact *tt*3 subsequent to the operation of contact *dx*15. When valve XVF is fired as just mentioned, the discriminating relay WPR is operated. Shortly after the receipt of the last impulse representing the tens digit the third digit counting valve VDY fires and brings about the operation of the third digit counting relay DY. The opening of contact *dy*4 releases relay TT. Upon the receipt of the units digit by the impulse receiving relay AD, the second impulse counting chain is stepped to register the value of the digit. If the units digit has one of the values "6" to "0" then the additional counting valve XVG is fired, it having, if fired in response to the hundreds digit, been extinguished upon the changing over of contact *dx*13. When valve XVG is fired as just mentioned, the discriminating relay WSR is operated. Shortly after the receipt of the last impulse representing the units digit the fourth digit counting valve VDZ fires and brings about the operation of the fourth digit counting relay DZ. Upon the operation of relay DZ, the test relay T is operated in a circuit, over front contact *dz*5, local to the incoming junction group selector, and the previously fired end-of-count valve VG is extinguished and relay TX released. Also, the latch electromagnet of the final selector is energised over contacts *tx*1, *tw*1, *dw*4, *dx*4, and *dz*3, and the second control wiper CAA of the incoming junction group selector, and the input wire WQQ of the impulse converter is connected over contacts *dw*5, *dx*5, and *dz*4, and the private wiper PA to the private wiper of the final selector. In general, wire WPP being connected to wire WNB, upon the operation of relay DZ the second impulse counting chain is stepped on, by complementary impulses constituted by output impulses of the impulse converter and produced each time the private wiper of the final selector encounters a further bank contact, until it has registered a total of ten the number of times necessary to produce the condition that both the first and second impulse counting chains are registering a total of ten. At each registration of a total of six by the second impulse counting chain during this operation, the additional counting valve XVG is fired and relay WSR operated. At each registration of a total of ten by the second impulse counting chain during this operation, a further additional counting valve VLD is fired and a transfer relay LD is operated, contacts *wsr*1 and *dz*10 being closed. Upon operation, relay LD at its contact *ld*1 extinguishes valve XVG and initiates the release of relay WSR. Upon release, relay WSR at its contact *wsr*1 extinguishes valve VLD and initiates the release of relay LD. The brief closing of front contact *ld*1 which results from the operations just described connects positive battery over a resistance YLD to the impulse input wire WNA of the first impulse counting chain, and thereby produced a complementary impulse for stepping the last-mentioned counting chain. If the tens digit has one of the values "1" to "5," upon the registration of a total of six by the first impulse counting chain as a result of the complementary impulses thus fed to it, the additional counting valve XVF is fired and relay WPR operated. Upon the registration of a total of ten by the first impulse counting chain as a result of the complementary impulses thus fed to it, the end-of-count valve VF is fired and relay TY is operated. This operation of relay TY prepares at contact *ty*1 the circuit of the end-of-count valve VG for firing and for bringing about the operation of relay TX. The next time the second impulse counting chain registers a total of ten, relay TX is operated and inserts relay TT into the circuit of the latch electromagnet of the final selector and brings this selector to rest on the outlet to the called subscriber. Relay TT operates, and at contact *tt*4 renders effective the tone detecting circuit comprising valve VTT and relay TB.

Assuming for the moment that the called subscriber's line is free, a switching relay HA in the incoming junction group selector circuit is operated in a circuit over contacts *b5*, *tb1*, *tt2*, and *dz9*, with the result that ringing current is fed to the line over the operating winding (I) of the ring-tripping relay F from an earthed source connected to wire WRC. The changing over of contacts *ha2* and *ha3* releases relay AD and operates the line relay A. Relay A on operation closes an alternative circuit for relay B. Contact *ha4* causes a ringing signal from a source WRS to be reverted by transformer action between winding (III) and windings (I) and (II) of relay A. When the called subscriber replies to the call, the ring-tripping relay F operates on its operating winding (I) in the circuit earthed source of ringing current connected to wire WRC, winding (I) of the relay, contacts *ha6* and *f3*, the positive wipers of the selectors, the loop over the called line, the negative wipers of the selectors, contacts *f2* and *ha5*, a resistance RN, negative battery connected to ringing-return wire WRR. Upon operation, relay F at its contact *f1* opens a short-circuit about its holding winding (II) and locks up on this winding in a circuit over contact *b7*, and at its contacts *f2* and *f3* completes the conversational circuit between the calling and called lines. The answering supervisory relay D operates over the loop over the called line, and at its contacts *d1* and *d2* reverses the current flowing over the incoming junction to give an answering supervisory signal in the well-known manner. Relays A and D and condensers QBB constitute a feeding bridge for the connection.

If the called subscriber's line is not free when the tone detecting circuit is rendered effective by the closing of contact *tt4*, then the busy relay TB is operated, and at its contact *tb1* opens the operating circuit of relay HA to prevent the operation of this relay and operates relay BP. On operation, relay BP at its contact *bp2* causes a busy signal to be reverted over the incoming junction.

Figures 7, 8, 9:
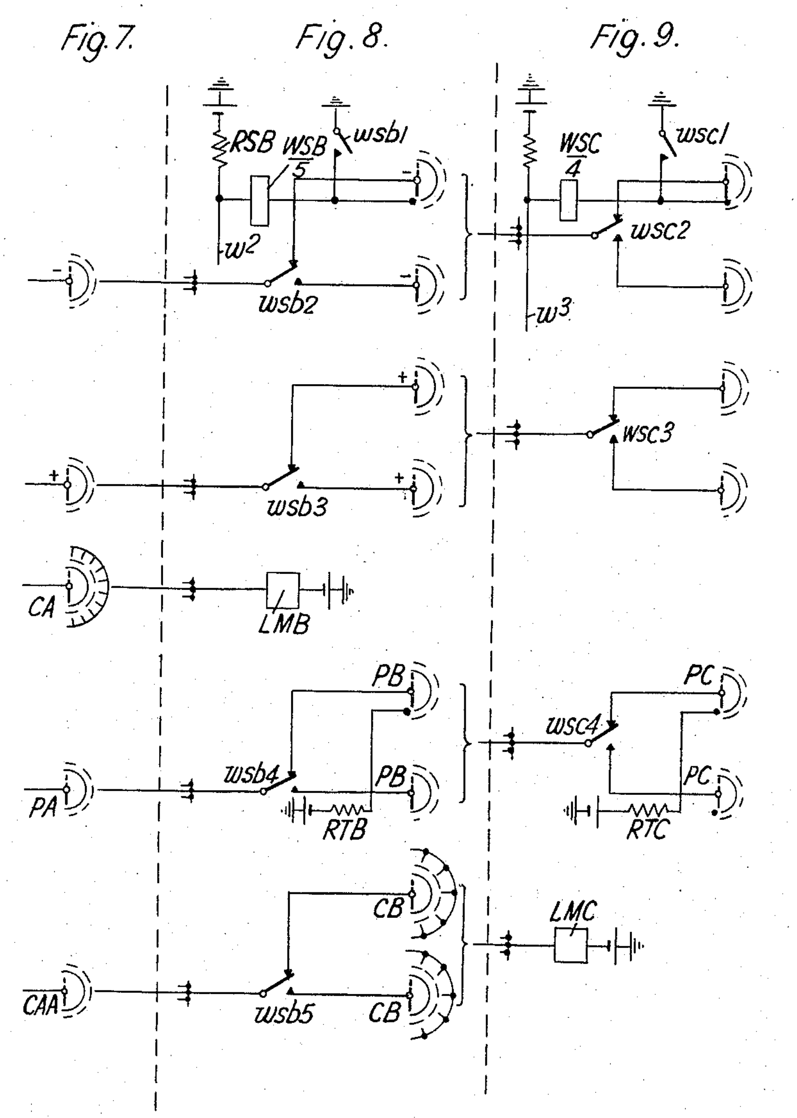

Referring now to Figs. 7, 8, and 9, these figures show how the pre-final and final selector circuits of Figs. 3 and 4 are modified when each of these selectors has two sets of wipers and when the method of wiper choosing referred to in connection with the incoming junction group selector of Figs. 6*a*, 6*b*, and 6*c* is employed. Fig. 7 shows the wipers of a group selector corresponding to the selector of Fig. 1 or the selector of Fig. 6*c*, Fig. 8 shows part of the circuit of a pre-final selector corresponding to the second selector of Fig. 3 and Fig. 9 shows part of the circuit of a final selector corresponding to the final selector of Fig. 4. If, when the pre-final selector of Fig. 8 is seized by the group selector of Fig. 7, earth is applied to the negative wiper of the selector of Fig. 7 before the pre-final selector is advanced from normal, then the wiper choosing relay WSB is operated in a circuit over contact *wsb2*, the upper negative wiper of the pre-final selector and its normal bank contact, the winding of the relay and resistance RSB. When so operated, relay WSB locks up over contact *wsb1*, and at its remaining contacts switches the lower wiper of each pair in circuit in place of the upper wiper of each pair. Wire $w^2$ is an additional wire included in the outlet to the pre-final selector circuit from the access switch of the selector homing circuit associated with the selector, and is earthed to ensure the release of relay WSB, if this relay should happen to be operated, when homing of the pre-final selector is effected. Correspondingly, if, when the final selector of Fig. 9 is seized by the group selector of Fig. 8 earth is applied to the negative wiper of the selector of Fig. 7 before the final selector is advanced from normal, then the wiper choosing relay WSC is operated and locks up and switches the lower wiper of each pair in circuit in place of the upper wiper of each pair. Wire $w^3$ corresponds to wire $w^2$ of Fig. 8.

Figure 10:
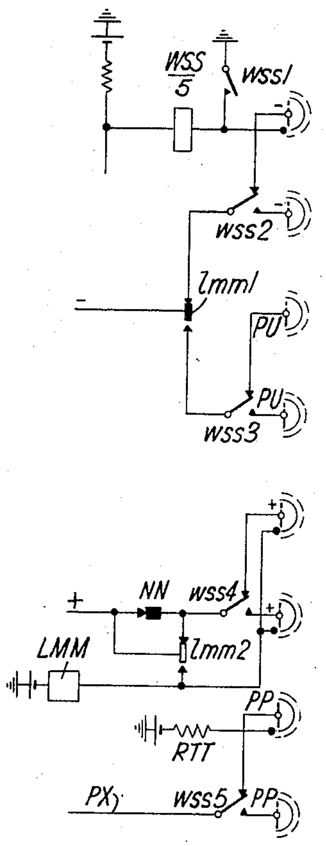

Referring now to Fig. 10, this figure shows how the selector circuits of Figs. 8 and 9 can be modified so that the speaking wires serve for the reversion of the complementary impulses and for the energisation of the latch electromagnets. Fig. 10 shows only those parts of a selector circuit which are concerned in this modification. The selector circuit of Fig. 10 has an incoming negative line wire, an incoming positive line wire, and an incoming private wire PX. Relay WSS is a wiper choosing relay corresponding to the wiper choosing relays of Figs. 8 and 9. Contacts *lmm1* and *lmm2* are contacts which are operated when the latch electromagnet LMM is energised and NN is an off-normal contact of the selector. Contacts *lmm1* and *lmm2* may be contacts directly actuated by the latch, or may be contacts of an auxiliary relay the winding of which is connected in parallel with the latch electromagnet. When driving of the selector is to take place, the incoming positive wire is earthed at a preceding circuit, and the latch electromagnet is consequently energised, first in a circuit over contact NN, contact *wss4*, one of the positive wipers and its normal bank contact, and then in a circuit over front contact *lmm2*. Wipers PP are the usual positive wipers, and wipers PU are the control wipers which encounter the relevant battery conditions constituting the complementary impulses. Whilst the selector is driving, contact *lmm1* connects the relevant wiper PU to the incoming negative wire in place of the relevant negative wiper, and the positive wipers are disconnected, as soon as the selector moves off normal, by the opening of contact NN. When the effective energisation of the latch electromagnet is terminated to bring the selector to rest on an outlet, the closing of back contact *lmm2* again connects the relevant positive wiper to the incoming positive wire.

What is claimed is:

1. In an automatic telephone system, a uniselector, an impulse counting chain of electronic devices comprising a plurality of such devices and means for operating them one at a time in turn in correspondence with impulses fed to the chain, means for setting the said impulse counting chain in response to a received digit to register the value of the digit, means for bringing about selective movement of the said uniselector from a specific starting position subsequent to such setting of the said impulse counting chain, means for producing complementary impulses in correspondence with selective movement of the said uniselector from the said specific starting position, a circuit for feeding the said complementary impulses to the said impulse counting chain, and means responsive to the registration of a predetermined total by the said impulse counting chain for signifying that the said uniselector has reached a position in accordance with the value of the received digit.

2. In an automatic telephone system as claimed in claim 1 in which the said uniselector constitutes a group selector, a wiper of the said uniselector included in the said means for producing complementary impulses, a further uniselector reached over an outlet of the said group selector and constituting a succeeding selector, a driving element of the said further uniselector, and a circuit over the said wiper for controlling the said driving element.

3. In an automatic telephone system, the combination as claimed in claim 1 in which the said uniselector constitutes a group selector, and the said means for producing complementary impulses includes a wiper of the said uniselector, a first pilot contact in the bank of the said wiper denoting the beginning of a group of outlets of the said group selector, a second pilot contact in the bank of the said wiper denoting the beginning of the next succeeding group of outlets of the said group selector, marking means applying a potential of one polarity to the said first and second pilot contacts and a potential of opposite polarity to contacts in the bank of the said wiper lying between these pilot contacts, electronic means connected to the said wiper and having two stable conditions and responsive, by a change of condition from a relevant one to the remaining one of these two stable conditions, to a change in either sense in the potential encountered by the said wiper, and means for producing a complementary impulse in response to a change of condition of the said electronic means from a particular one of the said two stable conditions to the other.

4. In an automatic telephone system, the combination as claimed in claim 1 in which the said uniselector includes a latch electromagnet, and the said means for producing complementary impulses includes a first wiper of the said uniselector, marking means applying a potential of one polarity to some contacts in the bank of the said first wiper and a potential of opposite polarity to other contacts in this bank, electronic means associated with the said first wiper and having two stable conditions and responsive, by a change of condition from a relevant one to the remaining one of these two stable conditions, to a change in either sense in the potential encountered by the said first wiper, means for producing a complementary impulse in response to a change of condition of the said electronic means, a coupling circuit for connecting the said electronic means to the said first wiper, and a change-over contact operated upon the energisation of the said latch electromagnet for connecting an incoming speaking wire, normally connected to a speaking wire wiper of the said uniselector, to the said first wiper to form part of the said coupling circuit.

5. In an automatic telephone system, the combination as claimed in claim 1 in which the said uniselector includes a latch electromagnet, and further comprising a circuit including an off-normal break contact of the said uniselector and an incoming speaking wire associated with the said uniselector in series for initially energising the said latch electromagnet, and a circuit independent of the said off-normal contact, and including a make contact of the said latch electromagnet and the said incoming speaking wire in series, for energising the said latch electromagnet during selective movement of the said uniselector.

6. In an automatic telephone system, the combination as claimed in claim 1 in which the said uniselector constitutes a final selector, and the said means for producing complementary impulses includes a wiper of the said uniselector, marking means applying a potential of one polarity to each odd contact in the bank of the said wiper and a potential of opposite polarity to each even contact in this bank, electronic means connected to the said wiper and having two stable conditions and responsive, by a change of condition from a relevant one to the remaining one of these two stable conditions, to a change in either sense in the potential encountered by the said wiper, and means for producing a complementary impulse in response to each change of condition of the said electronic means from either of the said two stable conditions to the other.

7. In an automatic telephone system, the combination as claimed in claim 6 in which the said wiper is a private wiper, and further comprising means for applying a busying tone condition to contacts in the bank of the said wiper corresponding to busy lines, tone detecting means responsive to busying tone, and means for connecting the said tone detecting means to the said wiper for determining the condition of a wanted line.

8. In an automatic telephone system, a uniselector constituting a final selector, a first impulse counting chain of electronic devices comprising a plurality of such devices and means for operating them one at a time in turn in correspondence with impulses fed to the chain, a second impulse counting chain of electronic devices comprising a plurality of such devices and means for operating them one at a time in turn in correspondence with impulses fed to the chain, means for setting the said first impulse counting chain in response to a received tens digit to register the value of the digit, means for setting the said second impulse counting chain in response to a received units digit to register the value of the digit, means for bringing about selective movement of the said uniselector from a specific starting position subsequent to such setting of the said first and second impulse counting chains, means for producing and feeding to the said first impulse counting chain complementary impulses in correspondence with registrations of a total of ten by the said second impulse counting chain, means for producing and feeding to the said second impulse counting chain complementary impulses in correspondence with selective movement of the said uniselector from the said specific starting position, and means responsive to the concurrent registrations of totals of ten by both the said first impulse counting chain and the said second impulse counting chain for signifying that the said uniselector has reached a position in accordance with the values of the received tens and units digits.

9. In an automatic telephone system, a first uniselector constituting a group selector, a first impulse counting chain of electronic devices comprising a plurality of such devices and means for operating them one at a time in turn in correspondence with impulses fed to the chain, a second impulse counting chain of electronic devices comprising a plurality of such devices and means for operating them one at a time in turn in correspondence with impulses fed to the chain, means for setting the said second impulse counting chain from an initial starting condition in response to a received hundreds digit to register the value of the digit, means for bringing about selective movement of the said first uniselector from a specific starting position subsequent to the setting of the said second impulse counting chain to register the value of the hundreds digit, means for producing and feeding to the said second impulse counting chain complementary impulses in correspondence with such selective movement of the said first uniselector, means responsive to the registration of a predetermined total by the said second impulse counting chain for signifying that the said first uniselector has reached a position in accordance with the value of the received hundreds digit and causing this uniselector to select a free outlet in the relevant group, a second uniselector constituting a final selector and connected to the said outlet of the said first uniselector, means for setting the said first impulse counting chain from an initial starting condition in response to a received tens digit to register the value of the digit, means for bringing about selective movement of the said second uniselector from a specific starting position subsequent to the setting of the said first impulse counting chain to register the value of the tens digit, means for producing and feeding to the said first impulse counting chain complementary impulses in correspondence with such selective movement of the said second uniselector and means responsive to the registration of a predetermined total by the said first impulse counting chain for signifying that the said second uniselector has reached a position in accordance with the value of the received tens digit.

10. In an automatic telephone system as claimed in claim 9, means for distributing received digits to the said first and second impulse counting chains including an electromagnetic digit counting relay corresponding to one received digit, a controlling electronic device individual to the said digit counting relay, means for preparing, prior to the receipt of the said one received digit, the said controlling electronic device for bringing about the operation of the said digit counting relay, and means for applying a bias preventing premature operation of the said digit counting relay to the said controlling electronic device whilst the particular one of the said first and second impulse counting chains on which the said one received digit is to be registered is in an initial starting condition.

11. In an automatic telephone system as claimed in claim 9, means for distributing received digits to the said first and second impulse counting chains including an electromagnetic digit counting relay corresponding to one received digit, a controlling electronic device individual to the said digit counting relay, means for applying a bias preventing premature operation of the said digit counting relay to the said controlling electronic device whilst the particular one of the said first and second impulse counting chains on which the said one received digit is to be registered is in an initial starting condition, a timing condenser, a circuit for charging the said timing condenser including a charging resistance, means for applying the voltage across the said timing condenser to the said controlling electronic device as an operating voltage prior to the receipt of the said one received digit, an electromagnetic impulse receiving relay on which the said one received digit is received, and a discharging circuit for the said timing condenser intermittently closed by a contact of the said impulse receiving relay during the receipt of the said one received digit to maintain the value of the voltage across the said timing condenser lower during such receipt than the value required to bring about the operation of the said digit counting relay.

12. In an automatic telephone system, a uniselector, an impulse counting chain of electronic devices comprising five such devices forming a closed chain and means for operating them one at a time in turn in correspondence with impulses fed to the chain, means for feeding impulses corresponding to a received digit to the said impulse counting chain to set this chain from an initial starting condition to register the value of the digit, an electromagnetic discriminating relay associated with the said impulse counting chain, means for bringing about the operation of the said discriminating relay on the attainment by the said impulse counting chain of its initial starting condition during its setting to register the value of a received digit, means for bringing about selective movement of the said uniselector from a specific starting position subsequent to such setting of the said impulse counting chain, and means responsive to the registration of either one or the other of two predetermined totals, depending upon whether the said discriminating relay is or is not operated, for signifying that the said uniselector has reached a position in accordance with the value of the received digit.

References Cited in the file of this patent

UNITED STATES PATENTS

| | | |
|---|---|---|
| 2,547,043 | Pouliart | Apr. 3, 1951 |
| 2,567,115 | McCreary | Sept. 4, 1951 |